US012666477B2

(12) United States Patent
Mallat et al.

(10) Patent No.: US 12,666,477 B2
(45) Date of Patent: Jun. 23, 2026

(54) ENERGY EFFICIENT BLUETOOTH MESH FRIENDSHIP

(71) Applicant: Silicon Laboratories Inc., Austin, TX (US)

(72) Inventors: Hannu Mallat, Hyvinkaa (FI); Jori Rintahaka, Espoo (FI)

(73) Assignee: Silicon Laboratories Inc., Austin, TX (US)

( * ) Notice: Subject to any disclaimer, the term of this patent is extended or adjusted under 35 U.S.C. 154(b) by 329 days.

(21) Appl. No.: 18/209,307

(22) Filed: Jun. 13, 2023

(65) Prior Publication Data

US 2024/0422839 A1     Dec. 19, 2024

(51) Int. Cl.
| | |
|---|---|
| *H04W 76/14* | (2018.01) |
| *H04W 48/08* | (2009.01) |
| *H04W 52/02* | (2009.01) |
| *H04W 84/18* | (2009.01) |

(52) U.S. Cl.
CPC ........... H04W 76/14 (2018.02); H04W 48/08 (2013.01); H04W 52/0229 (2013.01); *H04W 84/18* (2013.01)

(58) Field of Classification Search
CPC . H04W 76/14; H04W 48/08; H04W 52/0229; H04W 84/18; Y02D 30/70
See application file for complete search history.

(56) References Cited

U.S. PATENT DOCUMENTS

| | | | |
|---|---|---|---|
| 8,089,982 B1 * | 1/2012 | Vleugels | H04W 74/0816 |
| | | | 370/447 |
| 2002/0009158 A1 * | 1/2002 | Souissi | H04L 27/0006 |
| | | | 375/295 |
| 2012/0119902 A1 * | 5/2012 | Patro | H04W 52/0238 |
| | | | 340/502 |
| 2019/0199627 A1 * | 6/2019 | Di Marco | H04W 28/021 |
| 2020/0059771 A1 * | 2/2020 | Zhang | H04L 67/1042 |
| 2020/0084620 A1 * | 3/2020 | Jana | H04L 9/0869 |
| 2020/0092390 A1 * | 3/2020 | Agarwal | H04W 52/0251 |
| 2020/0367031 A1 * | 11/2020 | Fujita | H04W 8/00 |
| 2021/0022207 A1 * | 1/2021 | Hans | H04W 8/005 |
| 2022/0150831 A1 * | 5/2022 | Di Marco | H04W 52/0229 |

* cited by examiner

*Primary Examiner* — Steven Hieu D Nguyen
(74) *Attorney, Agent, or Firm* — Nields, Lemack & Frame, LLC

(57) ABSTRACT

A plurality of techniques that can reduce the power consumed by a low power node in a Bluetooth Mesh network are disclosed. One technique allows the low power node to receive more than one queued message from a friend node in a single packet, thereby reducing the number of transmissions required of the low power node. Another technique allows the low power node to utilize link layer device filtering so that messages that are not of interest are not processed by the low power node. A third technique allows the low power node to readily determine whether potential friend nodes are available before initiating the friendship establishment procedure.

18 Claims, 11 Drawing Sheets

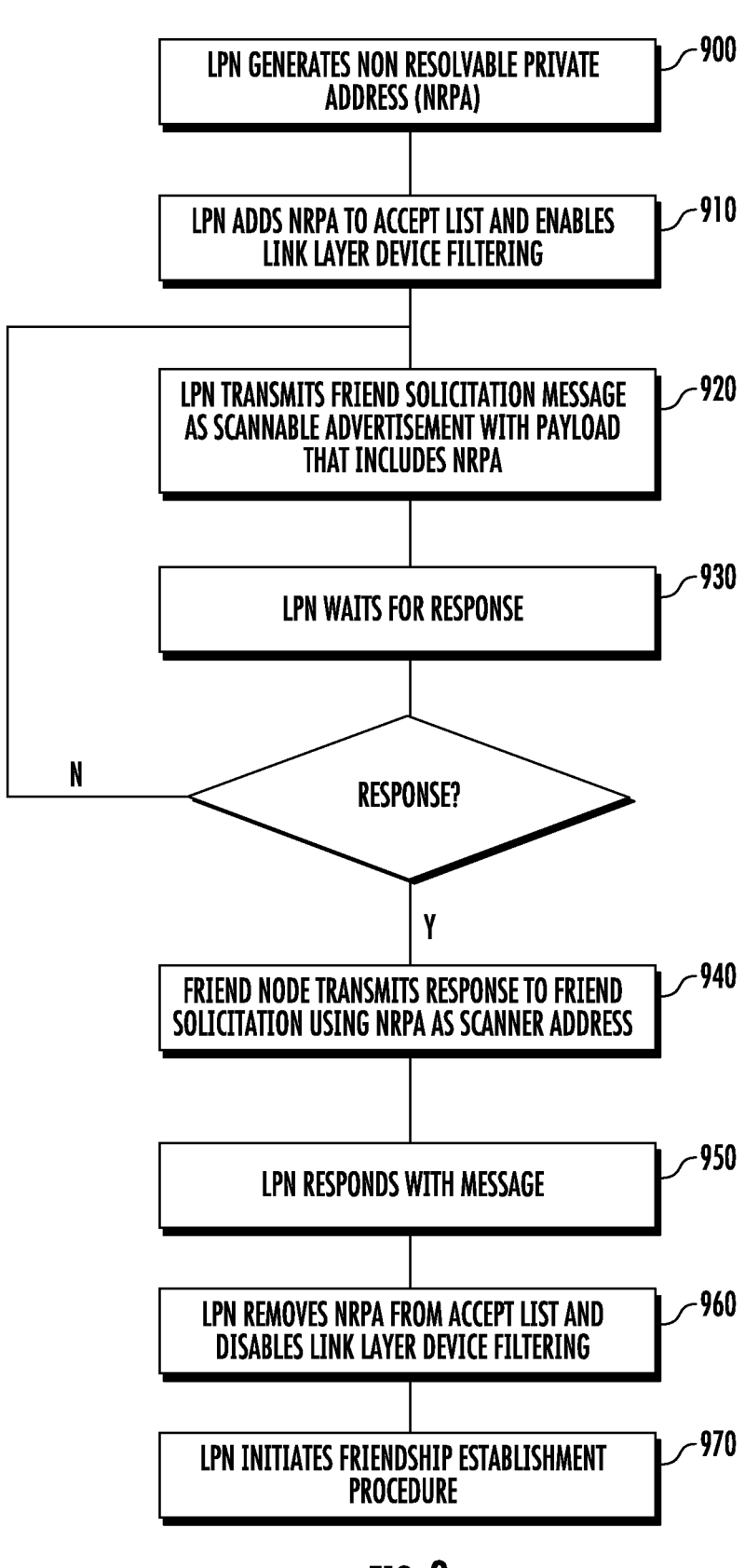

LPN GENERATES NON RESOLVABLE PRIVATE ADDRESS (NRPA) — 900

LPN ADDS NRPA TO ACCEPT LIST AND ENABLES LINK LAYER DEVICE FILTERING — 910

LPN TRANSMITS FRIEND SOLICITATION MESSAGE AS SCANNABLE ADVERTISEMENT WITH PAYLOAD THAT INCLUDES NRPA — 920

LPN WAITS FOR RESPONSE — 930

RESPONSE?

N

Y

FRIEND NODE TRANSMITS RESPONSE TO FRIEND SOLICITATION USING NRPA AS SCANNER ADDRESS — 940

LPN RESPONDS WITH MESSAGE — 950

LPN REMOVES NRPA FROM ACCEPT LIST AND DISABLES LINK LAYER DEVICE FILTERING — 960

LPN INITIATES FRIENDSHIP ESTABLISHMENT PROCEDURE — 970

FIG. 9

ENERGY EFFICIENT BLUETOOTH MESH FRIENDSHIP

FIELD

This disclosure describes a system and method for reducing power consumption for the Bluetooth Mesh friendship feature.

BACKGROUND

The Bluetooth protocol is one of many wireless network protocols that are currently in use. The Bluetooth protocol is commonly used to connect smartphones to watches, headphones, speakers, and other accessories. Bluetooth Low Energy utilizes 40 physical channels in the 2.4 GHz ISM band, each channel separated by 2 MHz.

The Bluetooth protocol has been expanded to include mesh networks, which is defined in the Bluetooth Mesh specification. Mesh networks are characterized by packet flooding, where packets are propagated by the retransmission of that packet by multiple devices in the mesh network. Further, in many mesh networks, devices are not within listening range of all of the other devices in the mesh network, and therefore each device relies on these retransmissions to receive packets from distant devices.

The Bluetooth specification also defines the concept of a friendship, where a first device serves as the friend of a second device. This second device is typically one that is low power and spends a significant amount of time in low power sleep mode. The first device receives and stores all messages that are destined for the second device while the second device is in the low power sleep mode. When the second device returns to the active mode, it queries the first device to retrieve any messages that were destined for the second device and captured by the first device.

While this concept has been adopted by the Bluetooth Mesh specification, it would be advantageous if there were enhancements which would allow mesh friendship to be more energy efficient. Further, it would be beneficial if these enhancements were compatible with the Bluetooth Mesh specification.

SUMMARY

A plurality of techniques that can reduce the power consumed by a low power node in a Bluetooth Mesh network are disclosed. One technique allows the low power node to receive more than one queued message from a friend node in a single packet, thereby reducing the number of transmissions required of the low power node. Another technique allows the low power node to utilize link layer device filtering so that messages that are not of interest are not processed by the low power node. A third technique allows the low power node to readily determine whether potential friend nodes are available before initiating the friendship establishment procedure.

According to one embodiment, a method of transmitting queued messages from a friend node to a low power node in a Bluetooth mesh network is disclosed. The method comprises wirelessly transmitting, from the low power node, a special poll message, referred to as a Friend Multi-Poll message; receiving, at the friend node, the Friend Multi-Poll message; transmitting from the friend node, in response to receipt of the Friend Multi-Poll message, an initial ADV_EXT_IND PDU, which indicates a selected channel on which a response will be transmitted; and transmitting, on the selected channel, one or more queued messages from the friend node to the low power node wherein the one or more queued messages are contained within an AUX_ADV_IND PDU. In some embodiments, a Friend Update message is also contained within the AUX_ADV_IND PDU, to indicate that all queued messages have been transmitted.

In some embodiments, all of the queued messages cannot be contained within the AUX_ADV_IND PDU. In this embodiment, the method further comprises transmitting, on the selected channel, a remainder of the queued messages, using one or more AUX_CHAIN_IND PDUs. In certain embodiments, a Friend Update message is also contained within a last of the one or more AUX_CHAIN_IND PDUs, to indicate that all queued messages have been transmitted.

In some embodiments, the Friend Multi-Poll message includes a Friend Sequence Number (FSN) and the Friend Sequence Number is greater than 1 bit. In certain embodiments, the FSN is used to indicate to the friend node whether all queued messages were successfully received.

In some embodiments, the low power node determines whether the friend node supports enhanced messaging based on messages exchanged during establishment of a friendship. In certain embodiments, during the establishment of the friendship, the low power node transmits a Friend Multi-Poll message to the friend node and the friend node responds with a Friend Update message. In certain embodiments, during the establishment of the friendship, the friend node transmits a manufacturer specific Friend Offer message to the low power node.

According to another embodiment, a method of reducing power consumption of a low power node in a Bluetooth mesh network is disclosed. The method comprises establishing a friendship with a friend node; placing an address of the friend node in an accept list; enabling link layer device filtering so that only messages transmitted by nodes with addresses in the accept list are processed. In some embodiments, the address of the friend node is a resolvable private address. In certain embodiments, the resolvable private address is generated from a random number and a hash of the random number and an Identity Resolving Key (IRK), and wherein the IRK is created using parameters that are known to both the friend node and the low power node.

According to another embodiment, a method for a low power node to determine whether a friend node is available is disclosed. The method comprises generating, at the low power node, a non-resolvable private address (NRPA); adding the NRPA to an accept list of the low power node; enabling link layer device filtering at the low power node; transmitting a scannable advertisement, wherein the NRPA is contained within a payload of the scannable advertisement; and waiting for a scan request message from a potential friend node, wherein a scanner address of the scan request message is the NRPA. In some embodiments, the low power node receives the scan request message, and the low power node initiates establishment of a friendship, a method of initiating establishment of the friendship comprising: transmitting a request response message; removing the NRPA from the accept list; disabling the link layer device filtering; and beginning a friendship establishment procedure. In some embodiments, the NRPA is encrypted in the payload of the scannable advertisement. In certain embodiments, the NRPA is encrypted using a key that is generated using parameters known by potential friend nodes. In some embodiments, a potential friend node receives the scannable advertisement, and the method further comprising: creating, at the potential friend node, a scan request message, wherein a scanner address of the scan request message is the NRPA; and transmitting the scan request message to the low power node in response to the scannable advertisement.

BRIEF DESCRIPTION OF THE DRAWINGS

For a better understanding of the present disclosure, reference is made to the accompanying drawings, in which like elements are referenced with like numerals, and in which:

FIG. 9 shows a sequence that may be used to determine if a potential friend node is available prior to initiating the friendship establishment procedure.

DETAILED DESCRIPTION

This disclosure describes improvements to the Bluetooth Mesh protocol's friendship feature. These improvements are intended to reduce power consumption. However, before describing these improvements, an explanation of various features defined by the Bluetooth specification is provided.

Non-connectable and non-scannable undirected advertising, also referred to as legacy advertising, is a form of broadcast from a sending device to unidentified and unenumerated recipients. The sending device does not expect any of the recipients to connect or request more data.

Bluetooth advertisement payloads are encoded as AD structures. An AD structure has a triplet, made up of length, AD Type and AD Data, where the length field records the combined byte count of the AD Type and AD Data fields, AD Type defines the type of data to follow, and AD Data contains the actual data to be transmitted. An Advertising Protocol Data Unit (PDU) may include multiple AD structures in it, concatenated one after another, while adhering to the PDU payload length limitations.

Figure 1:
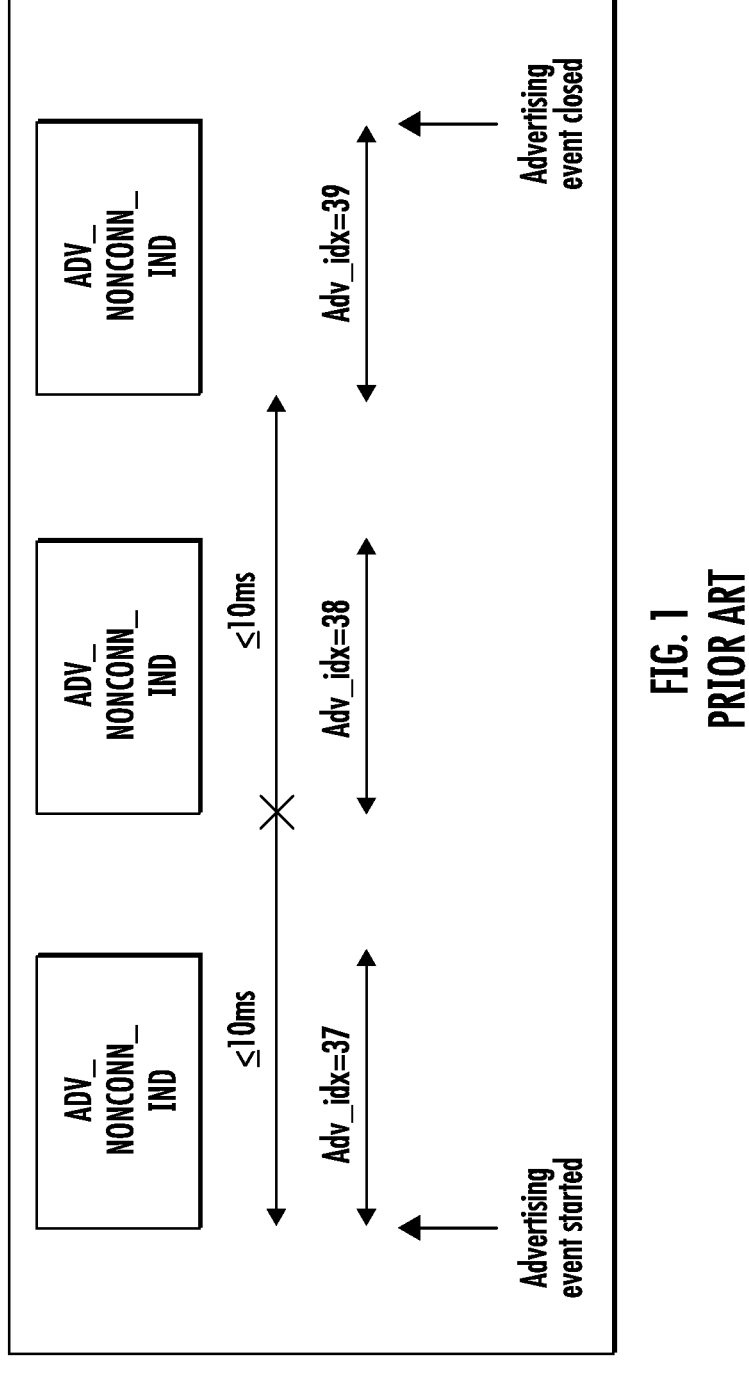
FIG. 1 illustrates a timing diagram showing legacy advertising.

FIG. 1, which is taken from the Bluetooth Core specification, illustrates legacy advertising.

In the Bluetooth Core specification, legacy advertising is implemented using ADV_NONCONN_IND PDUs, which contain the Bluetooth address of the device that advertises, and an advertising payload of up to 31 bytes. The payload is encoded as AD structures.

For each advertisement, the same PDU is transmitted three times, once for each Bluetooth Low Energy advertising channel (i.e., channels 37, 38 and 39). This sequence is known as an advertising event. Additionally, the interval between transmission on two consecutive advertising channels must be less than 10 milliseconds.

Later, in the Bluetooth Core specification, version 5, advertising was extended to allow for longer payloads, by adding new PDU types and by moving the payload data to Bluetooth Low Energy data channels, which are typically less congested than the advertising channels. For extended advertising, an ADV_EXT_IND PDU is used, which contains no payload data, but only information regarding the data channels that will be used to transmit the payload. As described above, the ADV_EXT_IND PDU is transmitted on all three advertising channels. This is followed by an AUX_ADV_IND PDU, which can contain up to 254 bytes of payload. This can optionally be followed by one or more AUX_CHAIN_IND PDUs which are also transmitted on the specified data channel and can also contain up to 254 bytes each. As described above, the payload data is encoded as AD structures.

Figure 2:
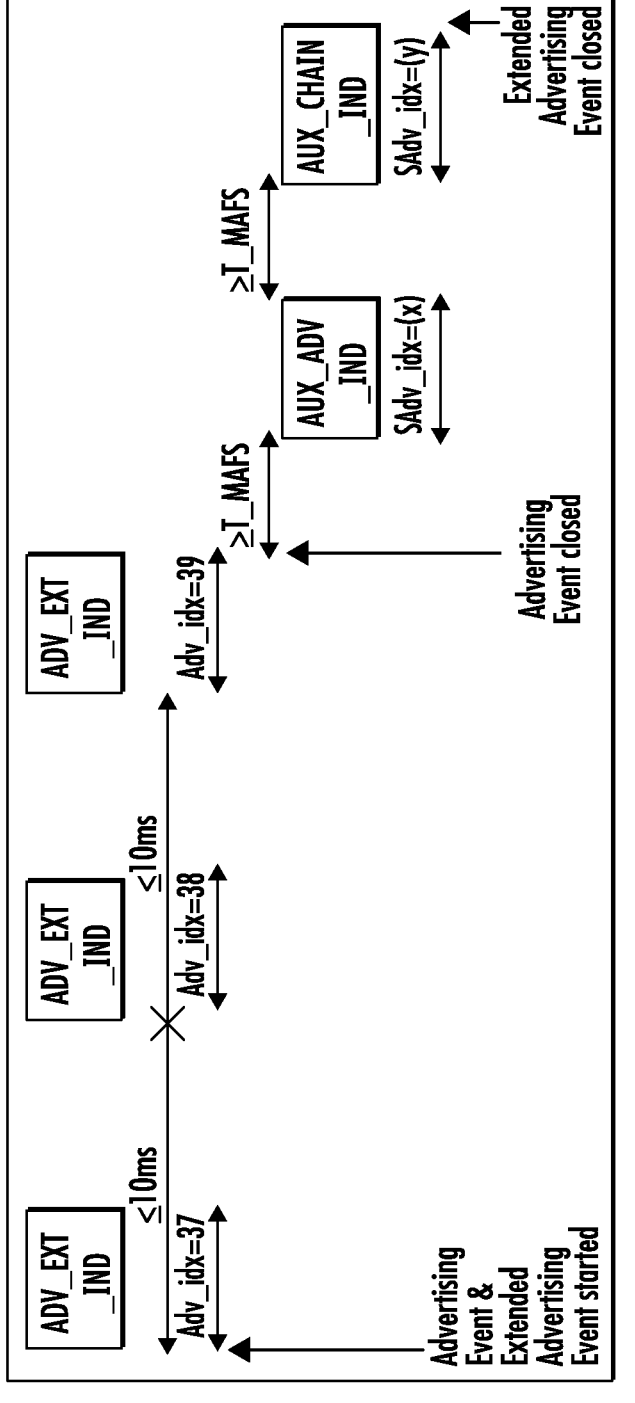
FIG. 2 illustrates a timing diagram showing extended advertising.

FIG. 2, which is taken from the Bluetooth Core specification, illustrates the extended non-connectable and non-scannable undirected advertising event. Note again that the time between transmissions of the ADV_EXT_IND PDU on consecutive advertising channels must be less than 10 milliseconds. The duration, T_MAFS, refers to the Minimum Aux Frame Space time, which is equal to 300 microseconds.

For each advertisement, the same PDU is transmitted three times, once for each Bluetooth Low Energy advertising channel (i.e., channels 37, 38 and 39). This sequence is known as an advertising event. After that, the payload is transmitted on the data channel specified in the ADV_EXT_IND PDU. As noted above, the payload may be contained within a single AUX_ADV_IND PDU, or within an AUX_ADV_IND PDU and one or more AUX_CHAIN_IND PDUS. Following the transmission of the payload, the extended advertising event is closed.

The Bluetooth protocol also defines active and passive scanning. In passive scanning, the Bluetooth device simply listens for incoming advertisements and then processes whatever it has received. In active scanning, the Bluetooth device that receives a scannable advertisement, may issue a scan request to the advertiser. This prompts the advertiser to respond to the scan request message. The scan response message may contain additional advertisement data.

In the Bluetooth core specification, active scanning is based on scannable undirected advertisements, using ADV_SCAN_IND PDUS, which can contain a payload of up to 31 bytes. The scan request is encoded using a SCAN_REQ PDU, which contained no payload, only the Bluetooth address of the advertiser and the Bluetooth address of the device requesting the scan response. Finally, the scan response is encoded using a SCAN_RSP PDU, which may contain a payload of up to 31 bytes. Note that all of these payloads are encoded as AD structures.

Figure 3:
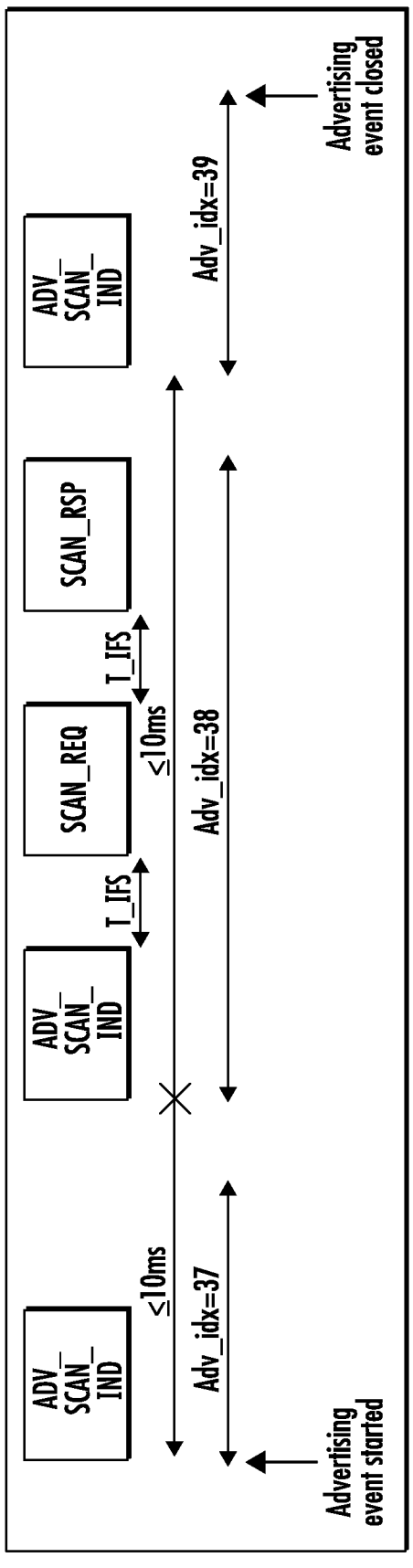
FIG. 3 illustrates a timing diagram showing message exchange during legacy active scanning.

FIG. 3, taken from the Bluetooth Core specification, illustrates the message exchange during active scanning. As before, the advertisement is transmitted on all three advertising channels. Note that the scan exchange must occur in less than 10 milliseconds. However, unlike nonscannable advertisements, these advertisements are transmitted using ADV_SCAN_IND PDUs. Further, a device that is listening on one of the advertising channels, such as channel 38, may request a scan, using a SCAN_REQ PDU. This request is followed by a scan response, using a SCAN_RSP PDU. Note that there are strict timing requirements regarding the SCAN_REQ and SCAN_RSP PDUs. As shown in FIG. 3, the SCAN_REQ and SCAN_RSP PDUs must be transmitted after a duration, defined as the inter-frame spacing period (T_IFS), after receipt of the ADV_SCAN_IND PDU and SAN_REQ PDU, respectively. This T_IFS is currently defined as 150 microseconds. After the scan request and response have been exchanged, the advertiser than moves to the next advertising channel, as shown in FIG. 3.

Another feature of the Bluetooth protocol is referred to as link layer device filtering. Link layer device filtering allows a receiving device to ignore messages that originate from any device that is not part of a set of explicitly permitted devices, based on an accept list of Bluetooth device addresses. The accept list is a list of Bluetooth device addresses. These addresses may be of any valid type, such as public address, resolvable private address or non-resolvable private address. The accept list is combined with policies that apply to particular operations. The scanner filter policy, when in use, restricted the processing of scanned advertising and scan response PDUs; the advertising filter policy, when in use, restricts the processing or scanned scan request and connection request PDUs.

When a policy is in use, PDUs that do not match one of the addresses in the accept list are dropped after reception and are not further processed. When a policy is not in use, all applicable PDUs are further processed.

The Bluetooth Mesh specification also defines a concept referred to as friendship. The friendship feature allows for low power nodes (LPNs), which are devices with a limited power budget, to sleep for extended periods of time and not listen to incoming messages. Rather, the messages that are destined for the LPN when it is in low power mode are captured by a Friend node, which buffers the messages until the LPN wakes up and polls the messages from the Friend node's queue.

All friendship related messaging, as well as all Bluetooth Mesh advertising based messaging, uses non-connectable non-scannable undirected advertisements. Furthermore, the Bluetooth Mesh protocol is defined to be compatible with the Bluetooth Core specification, version 4, so all payloads are limited to 31 bytes.

Figure 4:
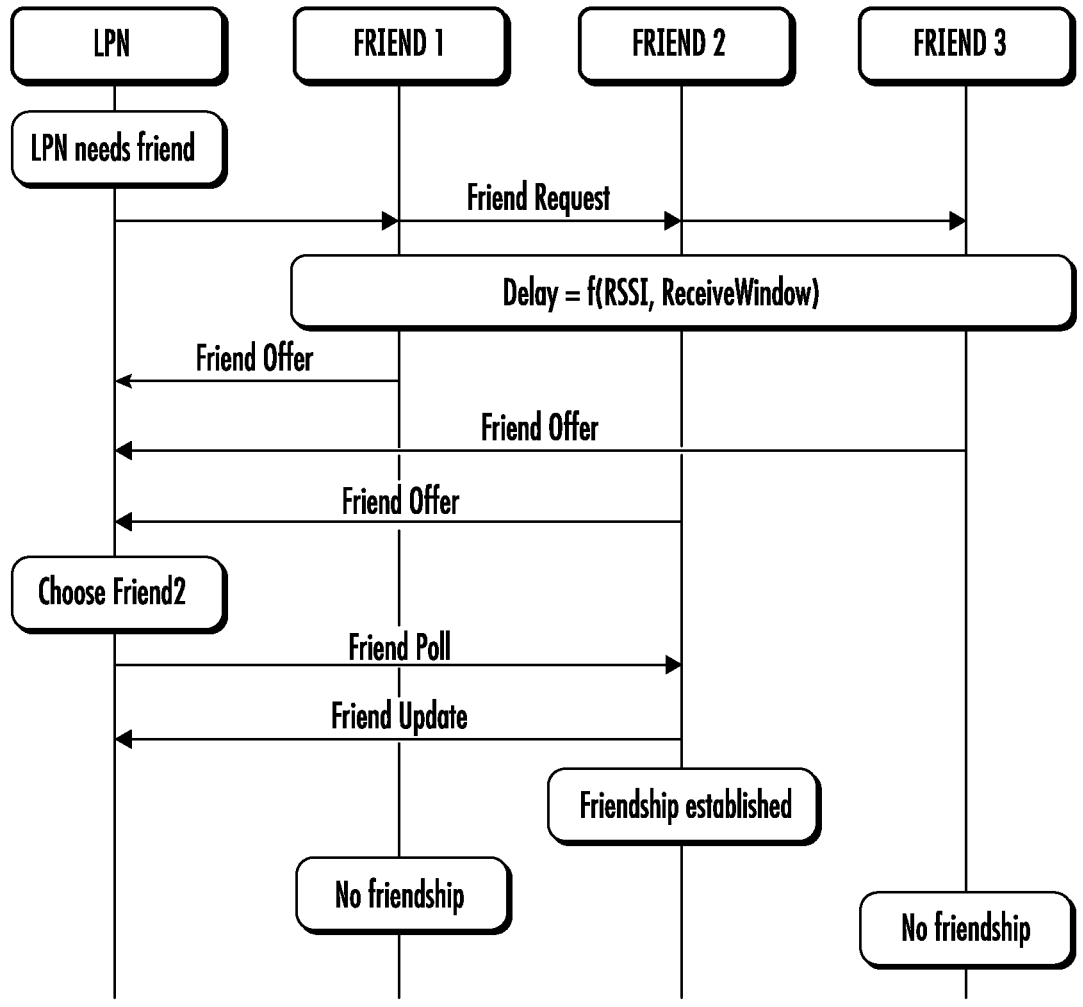
FIG. 4 illustrates a timing diagram showing a friendship establishment procedure.

First, a LPN and a friend node need to establish a friendship before the feature may be exploited. FIG. 4, taken from the Mesh Profile specification, illustrates the message exchange to establish a friendship. This may be referred to as the friendship establishment procedure. First, the LPN broadcasts a Friend Request, indicating that it wants to establish a friendship. This Friend Request is broadcast on the three advertising channels. This message is received by potential friend nodes in the radio range of the LPN. The Friend Request message includes parameters that indicate the type of friend that the LPN prefers.

After transmitting the Friend Request message, the LPN waits a predetermined amount of time, such as 100 milliseconds, and then begins listening to responses from potential friend nodes. The listening period lasts for up to one second.

Eligible potential friend nodes reply to the Friend Request message after the wait period, by broadcasting Friend Offer messages on the three advertising channels. Each potential friend nodes broadcasts its Friend Offer message with delay, which is based on how well the node marches with the LPN's stated preferences. In this way, the potential friend nodes that are the best matches broadcast their Friend Offer messages sooner than other nodes.

Once the LPN receives a suitable Friend Offer message, it will stop listening for more offers and sends a Friend Poll message to the chosen friend node. In response, the friend node will transmit a Friend Update message. This concludes the establishment of the friendship. Other potential friend nodes that did not receive s Friend Poll message will not form a friendship with the LPN.

As noted above, friend nodes are used to store messages that are intended for a LPN while the LPN is in sleep mode. Once the LPN exits the low power sleep mode, it may retrieve any messages from the Friend node's queue by transmitting a Friend Poll message. The friend node with respond either with a message that is located at the head of the queue, or with a Friend Update message, which indicates that the queue is empty.

Figure 5:
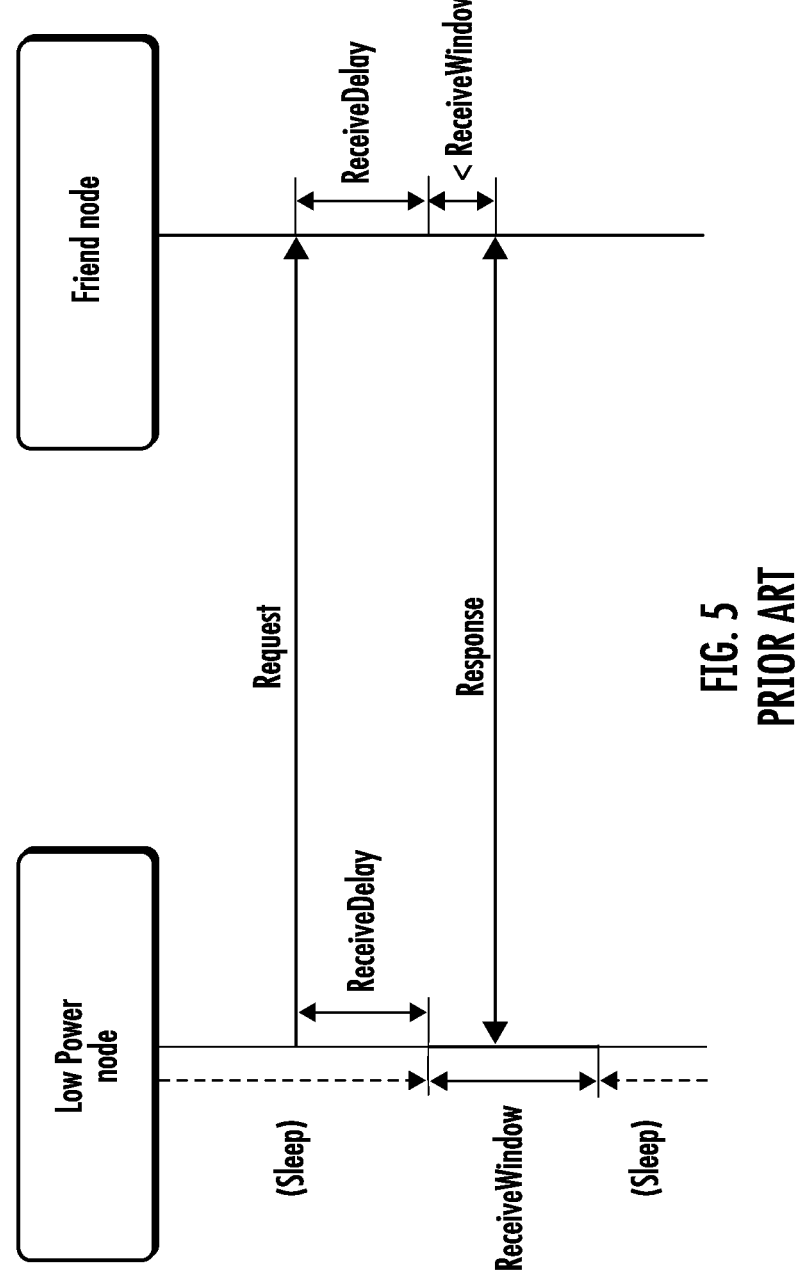
FIG. 5 illustrates a timing diagram showing message exchange between a low power node and a friend node.

FIG. 5, taken from the Mesh Profile specification, illustrates the message exchange used to retrieved stored messages from the friend node. This procedure is controlled by two timing parameters, agreed upon during the friendship establishment, referred to as ReceiveDelay and ReceiveWindow. The ReceiveDelay time is the duration of time between the friend node receiving the Friend Poll request and the earliest that the Friend node may transmit a response. This allows the friend node to prepare for sending the response, and also allows the LPN to prepare to receive the response. Additionally, the LPN may opt to enter the low power sleep node during this time to conserve power. The ReceiveWindow parameter defines the time window that the friend node must transmit the response as well as the time window that the LPN must remain awake and listening.

When the LPN receives a message as a response to a Friend Poll message, it may transmit another Friend Poll message, and repeat the sequence until a Friend Update message is received, indicating that there are no further messages to receive.

If, for any reason, the LPN did not receive a message from the friend node during the ReceiveWindow timeframe, it may poll again for the same message that it tried to poll for previously. The Friend Poll message contains a single bit, which is used to distinguish between the LPN requesting the same message again, or the next message in the queue.

A friendship is terminated by:
the LPN actively seeking another friend node,
the LPN not contacting the friend node for a predetermined amount of time, referred to as a poll timeout; or
the LPN not receiving responses to its Friend Poll messages.

Once a friendship is terminated, the LPN needs to establish a new friendship with the same friend node or another friend node.

Having defined the principles of operation currently used by the Bluetooth Mesh protocol, the remainder of the disclosure describes various new techniques to reduce power consumption in the LPN.

Figure 6A:
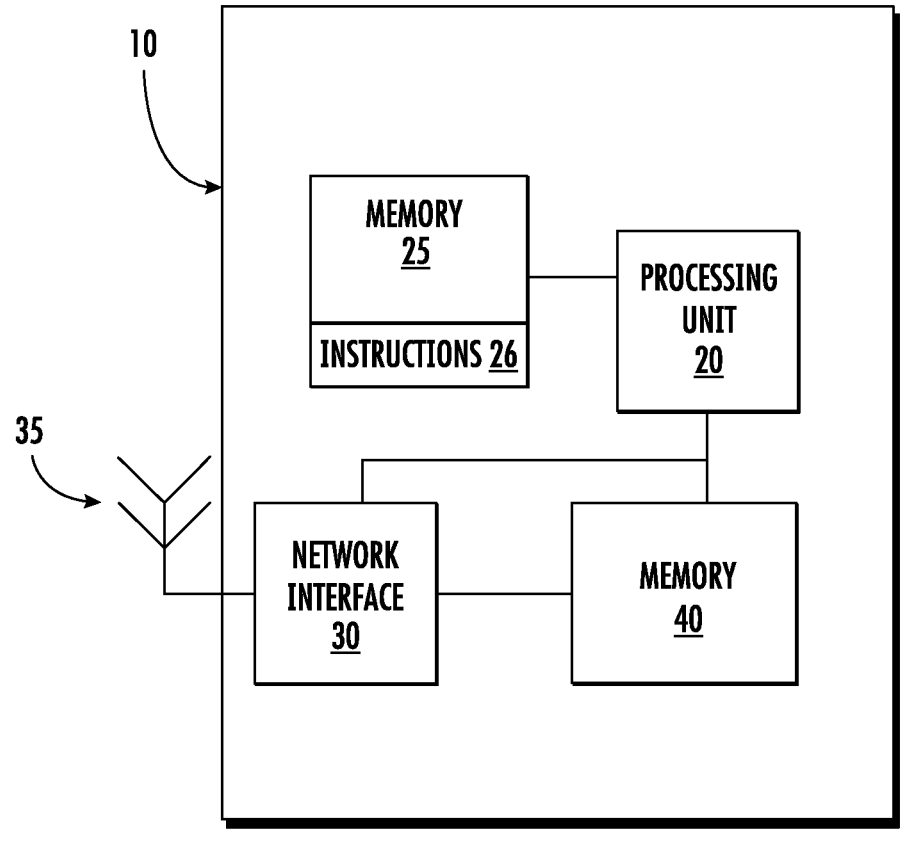
FIG. 6A shows a block diagram of a low power node and a friend node according to one embodiment.

FIG. 6A shows a block diagram of a representative Bluetooth device 10 that may be used to implement the disclosed method of minimizing power consumption used for friendship message exchanges in a Bluetooth mesh network.

The Bluetooth device 10 has a processing unit 20 and an associated memory device 25. The processing unit 20 may be any suitable component, such as a microprocessor, embedded processor, application specific circuit, a programmable circuit, a an microcontroller, or another similar device. This memory device 25 contains the instructions 26, which, when executed by the processing unit 20, enable the Bluetooth device 10 to perform the functions described herein. This memory device 25 may be a non-volatile memory, such as a FLASH ROM, an electrically erasable ROM or other suitable devices. In other embodiments, the memory device 25 may be a volatile memory, such as a RAM or DRAM.

While a memory device 25 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as for example, over a network connection (not shown), via CD ROM, or by another mechanism. These instructions may be written in any programming language, which is not limited by this disclosure. Thus, in some embodiments, there may be multiple computer readable non-transitory media that contain the instructions described herein. The first computer readable non-transitory media may be in communication with the processing unit 20, as shown in FIG. 6A. The second computer readable non-transitory media may be a CDROM, or a different memory device, which is located remote from the Bluetooth device 10. The instructions contained on this second computer readable non-transitory media may be downloaded onto the memory device 25 to allow execution of the instructions by the Bluetooth device 10.

The Bluetooth device 10 also includes a Bluetooth network interface 30 that connects with a Bluetooth mesh network 100 using an antenna 35.

The Bluetooth device 10 may include a second memory device 40 in which data that is received and transmitted by the Bluetooth network interface 30 is stored. This second memory device 40 is traditionally a volatile memory. The processing unit 20 has the ability to read and write the second memory device 40 so as to communicate with the other devices in the Bluetooth mesh network 100.

Although not shown, the Bluetooth device 10 also has a power supply, which may be a battery or a connection to a permanent power source, such as a wall outlet.

While the processing unit 20, the memory device 25, the Bluetooth network interface 30, and the second memory device 40 are shown in FIG. 6A as separate components, it is understood that some or all of these components may be integrated into a single electronic component. Rather, FIG. 6A is used to illustrate the functionality of the Bluetooth device 10, not its physical configuration.

Figure 6B:
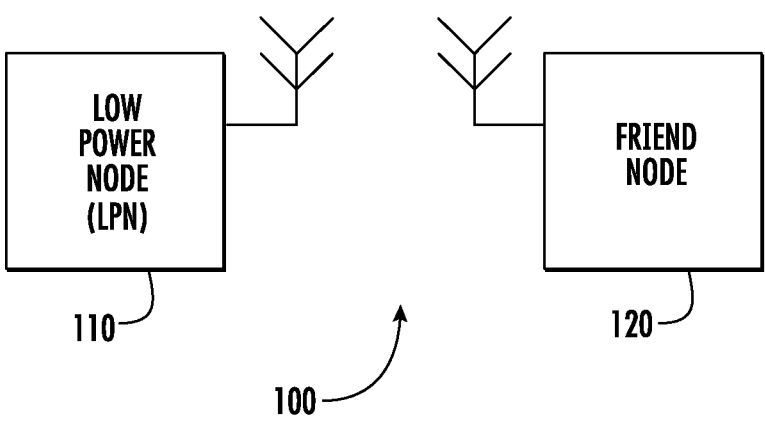
FIG. 6B shows a network with a low power node and a friend node.

FIG. 6B shows a Bluetooth mesh network 100 that includes a low power node (LPN) 110 and a friend node 120, both of which may have an architecture similar to that shown in FIG. 6A. In other words, both the LPN 110 and the friend node 120 are Bluetooth network devices. The LPN 110 may have a battery as a power source and may include a lower power processing unit and less memory capacity than the friend node 120.

The first improvement to mesh friendship is directed toward the process of receiving stored messages, which was shown in FIG. 5. As explained above, the LPN 110 must retrieve one message at a time from the friend node 120, using a sequence of Friend Poll messages and responses from the friend node to deliver one or more stored messages. Looking at FIG. 5, it can be seen that each exchange requires the LPN 110 to transmit a Friend Poll, and then be ready to receive a message for a duration of ReceiveWindow. This sequence repeats until a Friend Update message is received by the LPN 110.

One approach to reducing power consumption is to allow extended advertisements as specified in the Bluetooth Core specification, version 5 and shown in FIG. 2, rather than the legacy advertisements (see FIG. 1) that are currently used by the Bluetooth Mesh protocol.

As noted above, the payload for an extended advertising message, which is an AUX_ADV_IND PDU, is 254 bytes, sufficient to transmit up to eight stored message at one time. Assume that there are N messages in the friend node's queue. With the current approach, the LPN 110 transmits a minimum of N+1 Friend Poll messages (assuming no retransmissions) and receives N responses and one Friend Update message. If the extended advertising format is used and N is less than 8, the messages may be transmitted to the LPN 110 in a single PDU. While the amount of time that the LPN 110 is actually receiving messages is roughly equivalent, note that the amount of time that the LPN 110 must be actively listening is greatly reduced.

However, as noted above, the Bluetooth Mesh protocol does not utilize extended advertisements for friendship message exchanges. Thus, to make this new concept possible, the existing Friend Poll message must be replaced with an alternative message, referred to herein as a Friend Multi-Poll message. This is because, in the Friend Poll message, only 1 bit is used for sequence numbers to inform the friend node 120 whether to retransmit the previous message or to transmit the next message in the queue. However, while a single bit sequence number may be used, if the LPN 110 receives multiple messages, it would be beneficial if there were a means to indicate to the friend node 120 whether it needs to retransmit some or all of the messages, or whether the friend node 120 should transmit the next messages in the queue.

This can be accomplished using a plurality of sequence bits. For example, if there are a maximum of 15 messages that can be concatenated into a single extended advertisement, four bits of sequence number are sufficient to indicate the number of messages that were successfully received. For example, a value of "0000b" may indicate that no messages were successfully received, while a value of "1111b" indicates that all fifteen messages were successfully received.

In another embodiment, a friend sequence number (FSN) may be used, which may be 8 bits. The messages would be numbered as they are transmitted. Since there are only 8 bits of FSN, there will be wrapping of values after some number of messages have been received. Thus, the 256th message would again be given friend sequence number 0. Consider, for example, that the last Friend Multi-Poll message received from the LPN 110 indicates a FSN=248 and the friend node 120 delivered 16 messages in response. These messages would have FSN=247 . . . 255 and 0 . . . 7. Thus, any FSN transmitted by the LPN 110 between these ranges indicates that a retransmission of some of the messages is necessary. A subsequent Friend Multi-Poll message with a FSN of 8 indicates that all 16 messages were successfully received.

Thus, in the standard Friend Poll message, one byte is defined as follows:

Padding: 7 bits (all O's; other values are prohibited)

FSN: 1 bit (Friend Sequence Number)

In the new Friend Multi-Poll message, that byte may be defined as:

FSN: 8 bits (Friend Sequence Number).

Note that there are several variations of this field. For example, the byte may contain 4 bits of FSN and 4 bits of padding (if a maximum of 15 messages can be sent in a single response). Alternatively, the byte may contain between 5 and 7 bits of FSN, with the remainder being padding if desired. Furthermore, it is not essential that the FSN be exactly one byte. In another embodiment, the FSN may be extended to 2 or more bytes to eliminate the frequency of wrapping.

The following shows the mesh AD structure for a Friend Poll message, as currently defined. As noted above, this data is contained within an ADV_NONCONN_IND PDU.

| Field | Size (bits) | Notes |
|---|---|---|
| Length | 8 | Value is 20 |
| AD Type | 8 | Value is 0 × 2A (mesh advertisement) |
| IVI | 1 | Current IV Index |
| NID | 7 | NID derivation of network key |
| CTL | 1 | Value is 1 (control message) |
| TTL | 7 | Time to live (non-relayed) |
| SEQ | 24 | Sequence number |
| SRC | 16 | LPN's address |
| DST | 16 | Friend Node's address |
| SEG | 1 | Value is 0 (non-segmented) |
| Opcode | 7 | =0 × 01 (Friend Poll) |
| Padding | 7 | Unused (must be zero) |
| FSN | 1 | Single bit friend sequence number |
| NetMIC | 64 | Message integrity check |

As noted above, the AD structure is arranged as a triplet, with length, AD type and AD data.

The new Friend Multi-Poll message must also be contained within an ADV_NONCONN_IND PDU. However, the Bluetooth Mesh specification does not allow vendor unique extensions of the Transport Control Opcode. Therefore, the Friend Multi-Poll message may be implemented using a manufacturer specific AD structure instead of the Mesh AD structure shown above. There is some overhead associated with this vendor AD type use but the message still fits within the ADV_NONCONN_IND PDU. One possible format is shown below:

| Field | Size (bits) | Notes |
|---|---|---|
| Length | 8 | Value is 23 |
| AD Type | 8 | Value is 0 × FF (manufacturer specific) |
| Company ID | 16 | Value is vendor unique |
| Sub AD Type | 8 | Value is 0 × 2A (mesh advertisement) |
| IVI | 1 | Current IV Index |
| NID | 7 | NID derivation of network key |
| CTL | 1 | Value is 1 (control message) |
| TTL | 7 | Time to live (non-relayed) |
| SEQ | 24 | Sequence number |
| SRC | 16 | LPN's address |
| DST | 16 | Friend Node's address |
| SEG | 1 | Value is 0 (non-segmented) |
| Opcode | 7 | =0 × 01 (Friend Poll) |
| FSN | 8 | Eight bit friend sequence number |
| NetMIC | 64 | Message integrity check |

Note, as previously mentioned, the FSN may be longer than 8 bits, or may be less than 8 bits, but more than 1 bit. In this scenario, some padding may be included.

Figure 7A:
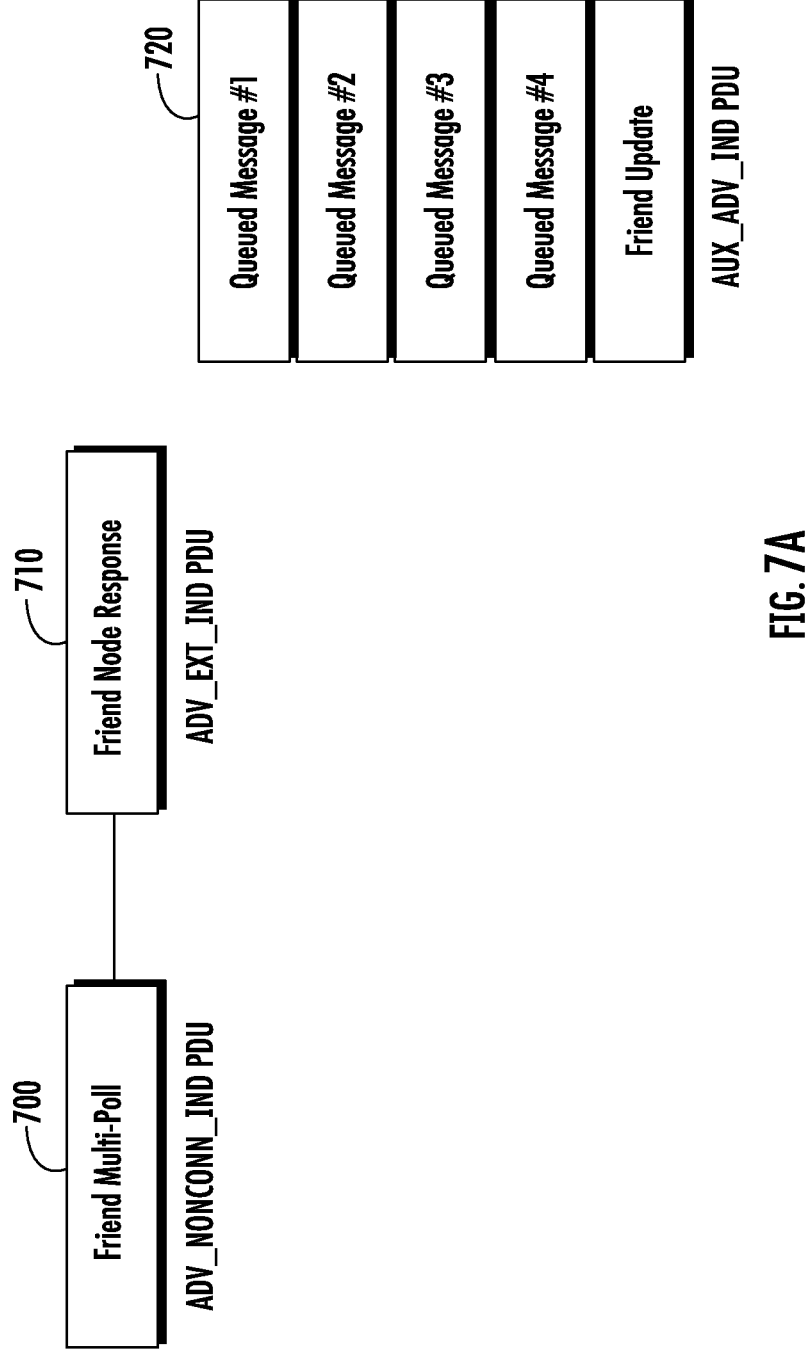
FIG. 7A shows a timing diagram showing the enhanced friendship message exchange according to one embodiment.

Thus, the enhanced message exchange procedure begins with the transmission of a Friend Multi-Poll message 700 from the LPN 110 to the friend node 120. This is transmitted on the three advertising channels. In response to a Friend Multi-poll message 700, the friend node 120 transmits a response, which utilizes extended advertisements. Specifically, as shown in FIG. 7A, the response includes an initial ADV_EXT_IND PDU 710, which provides the channel number for the subsequent AUX_ADV_IND PDU. This initial ADV_EXT_IND PDU 710 is transmitted on the three advertising channels. The AUX_ADV_IND PDU 720 contains the queued messages for the LPN 110. These messages are all arranged as AD structures and are transmitted in an ordered sequence. In FIG. 7A, a total of 4 messages are shown, but the disclosure is not limited to any particular number. Additionally, the AUX_ADV_IND PDU 720 may also contain a Friend Update message, indicating that all of the queued messages have been transmitted.

Figure 7B:
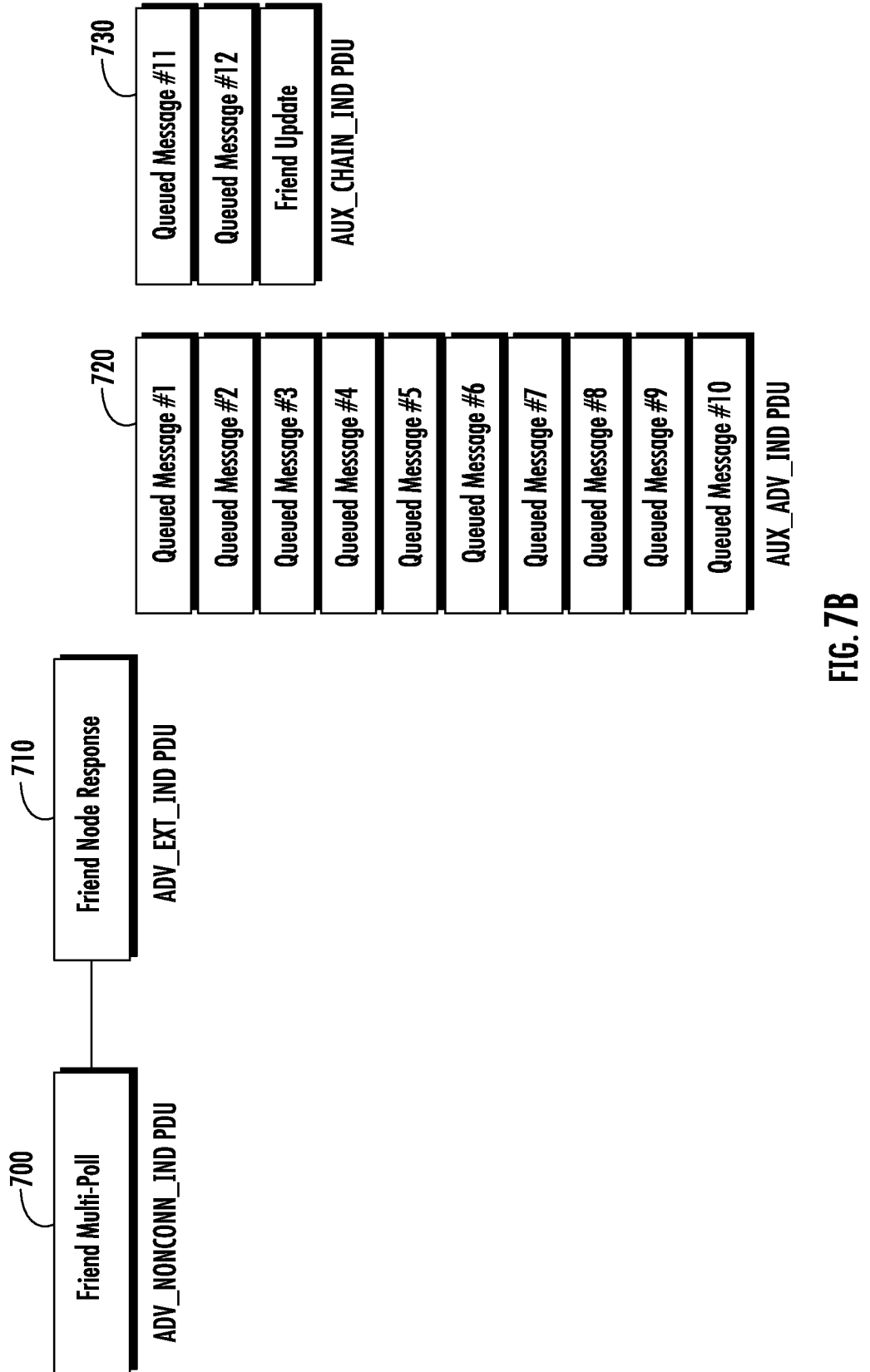
FIG. 7B shows a timing diagram showing the enhanced friendship message exchange according to another embodiment.

In certain embodiments, all of the queued messaged may not fit within a single AUX_ADV_IND PDU 720. In this case, the friend node 120 may also transmit one or more AUX_CHAIN_IND PDUS 730, which contain additional queued messages. FIG. 7B shows an example where there were twelve queued messages. As before, the friend node 120 transmits an initial ADV_EXT_IND PDU 710. The friend node 120 then transmits an AUX_ADV_IND PDU 720, as described above. However, in this example, only ten of these queued messages can fit within a single AUX_AD-V_IND PDU. Consequently, the friend node 120 also transmits an AUX_CHAIN_IND PDU 730 with the remaining queued messages, as well as the Friend Update message. Note that, if necessary, more than one AUX_CHAIN_IND PDUs may be transmitted. Each AUX_CHAIN_IND PDU 730 contains a pointer field indicating which channel the next PDU will be transmitted on.

Retransmissions operate as explained above. For example, assume that the friend node 120 transmitted the PDUs shown in FIG. 7B. Also assume that the friend sequence number begins at 0. If after transmission of these PDUs, the LPN 110 transmits a Friend Multi-Poll message with a FSN that is less than 12, this indicates that at least one of the queued messages was not received. In response, the friend node 120 transmits an initial ADV_EXT_IND PDU, followed by an AUX_EXT_IND PDU which contains the queued messages starting at the FSN transmitted by the LPN 110.

In order for this enhanced friendship message exchange procedure (also referred to as enhanced messaging) to be implemented in a backward compatible manner, it is necessary for LPNs and friend nodes to be able to determine whether other nodes can support this enhanced procedure. This may be done in a number of ways.

In one embodiment, there is a configuration state within each LPN that defines whether to use standard or the enhanced messaging procedure. This configuration state may be configurable by a network operator via an over the air configuration message. A similar configuration state may also be located in the friend nodes. This would allow the operator to configure the network as desired.

However, in other embodiments, the decision to use standard or enhanced messages may be a dynamic run time decision. The following shows one approach. First, the LPN 110 and the friend node 120 begin to negotiate a friendship in the standard manner, as shown in FIG. 4. After the LPN 110 selects a friend node 120, the LPN 110 sends a Friend Multi-Poll message, which is used to confirm the friendship.

If the friend node 120 supports enhanced messaging, it will respond with a Friend Update message. In this case, each device recognizes that the other device also supports the enhanced messaging procedure.

However, if the friend node 120 does not support enhanced messaging, it will ignore this Field Multi-Poll message from the LPN 110. The LPN 110 may then transmit a standard Friend Poll message and establish a standard friendship. Alternatively, the LPN 110 may reject this friend node and seek a different node that supports the enhanced messaging procedure.

In another embodiment, the LPN 110 may seek to distinguish between potential friend nodes that support enhanced messaging and those that do not before attempting to establish a friendship. In one embodiment, a manufacturer specific Friend Offer message may be created. This manufacturer specific Friend Offer message may utilize the manufacturer specific AD structure. In some embodiments, this manufacturer specific Friend Offer message may contain a payload that is similar or identical to the payload of a standard Friend Offer message. However, the length and type are different from a standard Friend Offer message.

A standard Friend Offer message is defined as follows:

| Field | Size (bits) | Notes |
|---|---|---|
| Length | 8 | Value is 25 |
| AD Type | 8 | Value is 0 × 2A (mesh advertisement) |
| IVI | 1 | Current IV Index |
| NID | 7 | NID derivation of network key |
| CTL | 1 | Value is 1 (control message) |
| TTL | 7 | Time to live (non-relayed) |
| SEQ | 24 | Sequence number |
| SRC | 16 | LPN's address |
| DST | 16 | Friend Node's address |
| SEG | 1 | Value is 0 (non-segmented) |
| Opcode | 7 | =0 × 04 (Friend Offer) |
| Parameters | 48 | Friend Offer parameters |
| NetMIC | 64 | Message integrity check |

In one embodiment, the manufacturer specific Friend Offer message may be defined as follows:

| Field | Size (bits) | Notes |
|---|---|---|
| Length | 8 | Value is 28 |
| AD Type | 8 | Value is 0 × FF (manufacturer specific) |
| Company ID | 16 | Value is vendor unique |
| SubAD Type | 8 | Value is 0 × 2A (mesh advertisement) |
| IVI | 1 | Current IV Index |
| NID | 7 | NID derivation of network key |
| CTL | 1 | Value is 1 (control message) |
| TTL | 7 | Time to live (non-relayed) |
| SEQ | 24 | Sequence number |
| SRC | 16 | LPN's address |
| DST | 16 | Friend Node's address |
| SEG | 1 | Value is 0 (non-segmented) |
| Opcode | 7 | =0 × 01 (Friend Poll) |
| Parameters | 48 | Friend Offer parameters |
| NetMIC | 64 | Message integrity check |

Thus, in this embodiment, the LPN 110 transmits the standard Friend Request message. Potential friend nodes reply with a Friend Offer message. If a potential friend node supports enhanced messaging, it also transmits a manufacturer specific Friend Offer message.

If the LPN does not support enhanced messaging, it simply ignores the manufacturer specific Friend Offer message. If, however, the LPN does support enhanced messaging, it may be able to distinguish between potential friend nodes that support enhanced messaging and those that do not. The LPN may then select the preferred friend node based on this information.

Enhanced messaging is one method to reduce power consumption of the low power node. However, other techniques are also possible.

The Bluetooth Mesh protocol requires the LPN 110 to listen to any device's advertisement PDUs during the ReceiveWindow time when it is waiting for the friend node 120 to respond to the Friend Poll or Friend Multi-Poll message. Thus, during this time, the LPN 110 may receive one or more advertisements that are not of interest. However, the LPN must process these advertisements, which may include decrypting the message. This consumes power and may cause the LPN 110 to miss the response from the friend node 120 that it is waiting for.

Figure 8:
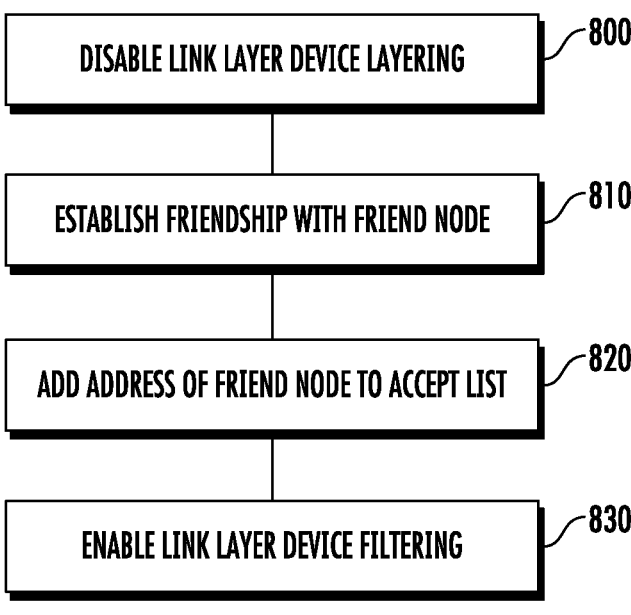
FIG. 8 shows a sequence that utilizes link layer device filtering during friendship exchanges.

To reduce or eliminate this unnecessary processing by the LPN 110, it is possible to make use of link layer device filtering. As described above, PDUs from devices that are not included on the accept list are simply discarded, reducing processing time for the LPN 110. FIG. 8 shows a flowchart that allows the LPN 110 to reduce power consumption by only listening to PDUs from nodes that it has established a friendship with.

First, as shown in Box 800, the link layer device filter is disabled, such that the LPN 110 receives and processes all incoming messages. The LPN 110 then establishes a friendship with a friend node 120, as shown in Box 810. The LPN 110 then adds the address of the friend node 120 to the accept list, as shown in Box 820. Finally, as shown in Box 830, the LPN 110 enables the link layer device filtering. At this point, only messages from friend nodes will be processed. When the friendship is terminated, the LPN 110 removes the address of the friend node 120 from its accept list. Additionally, an LPN 110 may support multiple concurrent friendships. In this embodiment, the LPN 110 must disable link layer device filtering whenever trying to establish a friendship (Box 810). This is to allow messages from potential friend nodes, with unknown addresses to be received and processed.

For this filtering to be effective, the address of the friend node must remain constant through the friendship. There are several ways that this may be done. In one embodiment, the LPN 110 uses the public or static Bluetooth address, which is read directly from the advertisement PDUs that the friend node transmits. In another embodiment, a resolvable private address (RPA) is used. This mechanism requires that the LPN 110 and the friend node 120 agree on an Identity Resolving Key (IRK) for the friend node, which is used to generate the RPA for the friend node. The IRK agreement may be performed using a message exchange between the LPN 110 and the friend node 120. In another embodiment, the IRK is done as a new derivation of the mesh network key used in the friend establishment message exchange. Both the LPN 110 and the friend node 120 are guaranteed to know the network key, as well as other parameters known to both nodes. For example, in one embodiment, the IRK is derived as follows:

Salt=s1("nkrf")
P=IVIndex || LPN Address || Friend Address || LPN Counter || Friend Counter
IRK=k1(NetKey, salt, P)

where s1( ) and k1( ) are hash functions defined in the Mesh specification, "nkrf" is a four character string constant, NetKey is the network key, IVIndex is the current IV Index of the network, LPN is the mesh address of the LPN, Friend Address is the mesh address of the friend node, and the counters are values carried in the Friend Request and Friend Offer messages, respectively.

Once the IRK is derived, the friend node can use a Friend RPA, generated from the IRK and a random value, for communicating with the LPN. The RPA may be a concatenation of the random number and a hash that is generated using the random number and the IRK.

The LPN is able to filter messages not originating from the friend node, as it also knows the IRK and the random number, and therefore can resolve the RPA successfully by comparing the received hash to one calculated locally using the random number and the IRK.

This approach alleviates the problem of traceability by passive listeners, compared to the use of static addresses throughout multiple friendships, but since the RPA is never changed during the friendship, it is not eliminated.

Thus, one modification of the above algorithm would be to also incorporate a derivation counter in the calculation of P. A derivation counter is one that increments at known events or times. For example, the derivation counter may increment whenever a certain number of messages have been transmitted from the friend node to the LPN. This may be done using the FSN in the Friend Multi-Poll message, for example. Further, to reduce the possibility of the link layer device filter incorrectly filtering a correct address, the LPN may add a first RPA associated with the current derivation counter and a second RPA associated with the next derivation counter in the accept list. When the friend node transitions to the second RPA, the first RPA is removed from the accept list and a third RPA, which is associated with the subsequent derivation counter, is added.

The frequency that the derivation counter is changed is implementation specific and is not limited by this disclosure. Further, the above disclosure described one algorithm for generating the IRK. Note that additional or different parameters may be used to generate the value of P. Thus, the general approach to generating the IRK may be to use parameters that are shared by the LPN 110 and the friend node 120, optionally in combination with other parameters, such as the network key.

To utilize this feature, a friend node 120 may utilize an RPA at all times. This is compatible with the Bluetooth Mesh specification. This approach requires the LPN to be able to detect whether the friend node supports RPAs. This is easily achieved by having the LPN 110 try to resolve the address provided by the friend node 120 in the Friend Update message. If it is resolvable, the LPN 110 knows that the friend node supports RPA and therefore, it can utilize the link layer device filtering. However, if the address is not resolvable, the LPN 110 does not utilize this feature.

The establishment of a friendship is another operation where the LPN 110 may expend a relatively large amount of power. In the worst case, the LPN has to scan for incoming Friend Offers for a full second, and there is no guarantee that a Friend is even available. Thus, to reduce power, it would be beneficial for the LPN 110 to know that there are potential friend nodes available before beginning the procedure to establish a friendship (see FIG. 4).

Thus, prior to transmitting the Friend Request message, the LPN 110 may transmit a scannable advertisement. As described above, in response to a scannable advertisement, one or more nodes may issue a SCAN_REQ PDU to obtain more information about the advertisement. Further, as explained above, the time between the transmission of the scannable advertisement and the SCAN_REQ PDU is much shorter than the ReceiveWindow for friendship establishment. Thus, the LPN 110 may listen for a much shorter period of time to determine whether a potential friend node is available.

However, while listening for the SCAN_REQ PDUs, the LPN 110 may receive other messages that are totally unrelated to the act of finding a friend node. Therefore, it would be beneficial if the LPN 110 used the link layer device filter feature to ignore unwanted messages.

However, the link layer device filter operates based on the address of the node that transmitted the message. In this current scenario, the LPN 110 is unaware of the address of any potential friend nodes.

To overcome this shortcoming, a special sequence may be used. First, the LPN 110 generates a non-resolvable private address, as shown in Box 900 of FIG. 9.

This non-resolvable private address is then added to the accept list for the LPN 110, as shown in Box 910. Additionally, the LPN 110 enables link layer device filtering.

Next, the LPN creates a special scannable advertisement, referred to as a Friend Solicitation message. The format of this Friend Solicitation message may take various forms. One example of a Friend Solicitation message is shown below:

| Field | Size (bits) | Notes |
|---|---|---|
| Length | 8 | Value is 27 |
| AD Type | 8 | Value is 0 × FF (manufacturer specific) |
| Company ID | 16 | Value is vendor unique |
| SubAD Type | 8 | Value is 0 × F5 (friendship solicitation) |
| EncNRPA | 48 | Encrypted nonresolvable private address |
| Random | 104 | Random value |
| MIC | 32 | Message integrity check |

Of course, the message may be created using different fields and/or different values.

As seen above, the encrypted non-resolvable private address is contained within the payload of the scannable advertisement. The LPN 110 then transmits this Friend Solicitation message as a scannable advertisement, contained within an ADV_SCAN_IND PDU, as shown in Box 920. This is transmitted on the three advertising channels. The LPN 110 then waits for a response, as shown in Box 930. However, the Bluetooth protocol specifies that a response to a scannable advertisement must arrive after a duration of T_IFS, which is only 150 milliseconds. Thus, the listening period for the LPN 110 is much shorter in this instance than in a traditional friendship establishment procedure, such as that shown in FIG. 4.

Potential friend nodes receive this scannable advertisement and may attempt to respond to it with a SCAN_REQ PDU, requesting more information. However, because the LPN has link layer device filtering enabled, in order for these SCAN_REQ PDUs to be processed by the LPN 110, they must originate from the non-resolvable private address. In other words, rather than placing their own address in the scanner's address field of the SCAN_REQ PDU, the potential friend nodes place the non-resolvable private address in that field, as shown in Box 940. In response, the LPN 110 transmits a SCAN_RSP PDU, as shown in Box 950. Note that the content of this response is not important, since the purpose of this sequence was simply to determine whether there was at least one potential friend node that was available.

Note that in certain embodiments, the potential friend nodes may not be able to decode the incoming scannable advertisement and generate the scan request message in the allocated time frame. Thus, if a response is not received, the LPN 110 may wait and then retransmit the scannable advertisement again. The potential friend nodes may recognize this this retransmitted advertisement is identical to the previous one and may therefore have the appropriate scan request message ready to transmit. If the LPN 110 repeats this sequence one or more times without getting a response, it may conclude that there are no potential friend nodes in the area. In this case, it may revert to the traditional sequence, shown in FIG. 4.

If, however, at least one scan request message is received, the LPN 110 knows that a potential friend node is available. In response, the LPN 110 will remove the non-resolvable private address from its accept list, and disable the link layer device filtering, as shown in Box 960. Lastly, the LPN 110 will begin the friendship establishment sequence that is detailed in FIG. 4, as shown in Box 970.

As noted above, the non-resolvable private address may be encrypted using different approaches. One example is provided below.

The encryption key used to encrypt the non-resolvable private address (which is needed by both the LPN and the potential friend nodes) may be a derivation of the network key that the LPN 110 wishes to use for the friendship.

---

Salt = s1("nkfs")
P="id128"|0x01
FriendshipSolicitationKey = k1(NetKey, salt, P)

--- where s1( ) and k1( ) are hash functions defined in the Mesh specification, "nkfs" is a four character string constant, and NetKey is the network key. Other constants may be used to create the variable "P".

The non-resolvable private address, NRPA, is encrypted using the FriendshipSolicitationKey, as follows:

---

Random = 104 bit random value
EncNRPA, MIC = AES-CCM(Random, NRPA)

---

The AES-CCM is computed using the FriendshipSolicitationKey as the key. Of course, other approaches may be used to encrypt the NRPA.

This procedure may be implemented in systems that include both standard devices and enhanced devices. For example, if the LPN is enhanced, it can transmit the Friend Solicitation message. The lack of a response will cause the LPN to revert to standard operation. Similarly, a friend node that is configured to respond to Friend Solicitation messages will only do so if it receives a Friendship Solicitation message. Thus, its enhanced capabilities are only enabled once it determines that there is at least one LPN that supports the Friendship Solicitation message.

Note that any constants or other values that are not mandated by the Bluetooth or Mesh specification are purely for illustrative purposes. Other values may be used without departing from the spirit of the disclosure.

The present system and method have many advantages. Each of these enhancements serves to reduce the power consumption of a low power node.

In the enhanced messaging procedure, the low power node is able to obtain multiple queued messages in one packet, rather than having to poll for each queued message individually. This reduces the number of packets that the low power node needs to transmit and reduces the amount of time that the low power node must spend listening for messages.

Use of the link layer device filtering allows the low power node to discard messages that do not originate from specific nodes. This again saves power at the low power device.

Finally, the friend solicitation message allows the low power node to determine whether potential friend nodes are available without having to listen to network traffic for at least one second, as is prescribed in the standard friendship establishment procedure.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method of transmitting queued messages from a friend node to a low power node in a Bluetooth mesh network, the method comprising:
   previously establishing a friendship between the low power node and the friend node;
   wirelessly transmitting, from the low power node, a special poll message, different from a Friend Poll message, referred to as a Friend Multi-Poll message, wherein the Friend Multi-Poll message indicates that the low power node is able to accept multiple queued messages transmitted in a single Protocol Data Unit (PDU);
   receiving, at the friend node, the Friend Multi-Poll message;
   transmitting from the friend node, in response to receipt of the Friend Multi-Poll message, an initial ADV_EXT_IND PDU, which indicates a selected channel on which a response will be transmitted; and
   transmitting, on the selected channel, one or more queued messages from the friend node to the low power node wherein the one or more queued messages are contained within an AUX_ADV_IND PDU.

2. The method of claim 1, wherein a Friend Update message is also contained within the AUX_ADV_IND PDU, to indicate that all queued messages have been transmitted.

3. The method of claim 1, wherein all of the queued messages cannot be contained within the AUX_ADV_IND PDU, wherein the method further comprises:
   transmitting, on the selected channel, a remainder of the queued messages, using one or more AUX_CHAIN_IND PDUs.

4. The method of claim 3, wherein a Friend Update message is also contained within a last of the one or more AUX_CHAIN_IND PDUs, to indicate that all queued messages have been transmitted.

5. The method of claim 1, wherein the Friend Multi-Poll message includes a Friend Sequence Number (FSN) and the Friend Sequence Number is greater than 1 bit.

6. The method of claim 5, wherein the FSN is used to indicate to the friend node whether all queued messages were successfully received.

7. The method of claim 1, wherein the low power node determines whether the friend node supports enhanced messaging based on messages exchanged during establishment of a friendship.

8. The method claim of 7, wherein during the establishment of the friendship, the low power node transmits a Friend Multi-Poll message to the friend node and the friend node responds with a Friend Update message.

9. The method of claim 7, wherein during the establishment of the friendship, the friend node transmits a manufacturer specific Friend Offer message to the low power node.

10. A Bluetooth mesh network, comprising:

a low power node; and a friend node, wherein the friend node comprises:

a Bluetooth network interface;

a processing unit; and a memory device, in communication with the processing unit, comprising instructions, which when executed by the processing unit, enable the friend node to:

previously establish a friendship between the low power node and the friend node;

receive a special poll message, different from a Friend Poll message, referred to as a Friend Multi-Poll message from the low power node, wherein the Friend Multi-Poll message indicates that the low power node is able to accept multiple queued messages transmitted in a single Protocol Data Unit (PDU);

transmit, in response to receipt of the Friend Multi-Poll message, an initial ADV_EXT_IND PDU, which indicates a selected channel on which a response will be transmitted; and transmit, on the selected channel, one or more queued messages to the low power node wherein the one or more queued messages are contained within an AUX_ADV_IND PDU.

11. The Bluetooth mesh network of claim 10, wherein a Friend Update message is also contained within the AUX_ADV_IND PDU, to indicate that all queued messages have been transmitted.

12. The Bluetooth mesh network of claim 10, wherein all of the queued messages cannot be contained within the AUX_ADV_IND PDU, wherein the memory device further comprises instructions, which when executed by the processing unit, enable the friend node to:

transmit, on the selected channel, a remainder of the queued messages, using one or more AUX_CHAIN_IND PDUS.

13. The Bluetooth mesh network of claim 12, wherein a Friend Update message is also contained within a last of the one or more AUX_CHAIN_IND PDUs, to indicate that all queued messages have been transmitted.

14. The Bluetooth mesh network of claim 10, wherein the Friend Multi-Poll message includes a Friend Sequence Number (FSN) and the Friend Sequence Number is greater than 1 bit.

15. The Bluetooth mesh network of claim 14, wherein the FSN is used by the low power node to indicate to the friend node whether all queued messages were successfully received.

16. The Bluetooth mesh network of claim 10, wherein the low power node determines whether the friend node supports enhanced messaging based on messages exchanged during establishment of a friendship.

17. The Bluetooth mesh network of claim 16, wherein during the establishment of the friendship, the low power node transmits a Friend Multi-Poll message to the friend node and the friend node responds with a Friend Update message.

18. The Bluetooth mesh network of claim 16, wherein during the establishment of the friendship, the friend node transmits a manufacturer specific Friend Offer message to the low power node.

* * * * *